(12) United States Patent
El Mghazli et al.

(10) Patent No.: US 9,451,441 B2
(45) Date of Patent: Sep. 20, 2016

(54) SMART CARD PERSONNALIZATION

(71) Applicant: Alcatel Lucent, Boulogne Billancourt (FR)

(72) Inventors: Yacine El Mghazli, Nozay (FR); Laurent Thomas, Nozay (FR); Alberto Conte, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 16 days.

(21) Appl. No.: 14/378,918

(22) PCT Filed: Feb. 6, 2013

(86) PCT No.: PCT/EP2013/052315
§ 371 (c)(1),
(2) Date: Aug. 14, 2014

(87) PCT Pub. No.: WO2013/124154
PCT Pub. Date: Aug. 29, 2013

(65) Prior Publication Data
US 2016/0021527 A1  Jan. 21, 2016

(30) Foreign Application Priority Data

Feb. 24, 2012 (EP) ................................. 12305215

(51) Int. Cl.
*H04W 8/04* (2009.01)
*H04W 12/04* (2009.01)
*H04W 8/26* (2009.01)
*H04W 8/18* (2009.01)
*H04W 76/02* (2009.01)

(52) U.S. Cl.
CPC ............... *H04W 8/04* (2013.01); *H04W 8/18* (2013.01); *H04W 8/265* (2013.01); *H04W 12/04* (2013.01); *H04W 76/021* (2013.01)

(58) Field of Classification Search
CPC ..... H04W 12/06; H04W 12/04; H04W 8/12; H04W 8/205; H04W 8/265; H04W 8/04; H04W 8/06; H04W 8/08; H04W 92/10; H04L 63/0853; H04L 2209/80; H04L 63/0869; H04L 63/061; H04L 2463/061; H04L 9/0844
USPC ..................................................... 455/435.1
See application file for complete search history.

(56) References Cited

U.S. PATENT DOCUMENTS

| 6,934,391 B1 | 8/2005 | Linkola et al. |
| 2010/0159924 A1* | 6/2010 | Lagerman ............... H04W 8/26 455/433 |
| 2010/0203864 A1* | 8/2010 | Howard ................. H04W 12/04 455/411 |

FOREIGN PATENT DOCUMENTS

| EP | 2182750 | 5/2010 |
| JP | 2013527656 | 6/2013 |

(Continued)

*Primary Examiner* — Kwasi Karikari
(74) *Attorney, Agent, or Firm* — Patti & Malvone Law Group, LLC

(57) ABSTRACT

A smart card associated with a subscription to a first telecommunication network and coupled with a communication is personalized by an application server. The server receives a request of subscription change having an identifier of a second telecommunication network; establishes a secured session with home location register of the second telecommunication network identified by the identifier and receives a first message having a second international identity and a second authentication key from the home location register; and then sends a second message having a personalization command, an admin code, the second international identity and the second authentication key to the communication device. The smart card is able to interpret the personalization command to delete the first international identity and the first authentication key and replace them by the second international identity and the second authentication key if the admin code is valid.

12 Claims, 2 Drawing Sheets

(56) References Cited

FOREIGN PATENT DOCUMENTS

| JP | 2013535142 | 9/2013 |
|----|------------|--------|
| WO | 01/76309 | 10/2001 |
| WO | 2008076031 | 6/2008 |
| WO | 2011153714 | 12/2011 |

* cited by examiner

SMART CARD PERSONNALIZATION

FIELD OF THE INVENTION

The present invention relates to a personalization of a smart card via a telecommunication network.

BACKGROUND

Mobile communications provides access by mobile phones, Personal Digital Assistant PDAs, portable computers and a variety of other user equipment to communicate via radio access networks (RANs) to core networks for connection to other mobile devices, the Internet, and conventional land-line phones. The RANs are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station. Communications between the core network and the base station is encrypted and communications between the base station and the wireless user equipment is also encrypted.

Mobile Networks are using a strong authentication method based on a shared secret configured on the network side in the Authentication Center of the HLR or the HSS, and on the terminal side in the Universal Integrated Circuit Card (UICC) containing a SIM (Subscriber Identity Module) application for a GSM network or a USIM (Universal Subscriber Identity Module) in a UMTS network.

This shared secret is an authentication key and the action to configure a generic UICC card with a given authentication key is called personalization.

The authentication key is a 128 bit key used in the authentication and cipher key generation process. The authentication key is used to authenticate the UICC card on the mobile network. Each UICC contains this authentication key which is assigned to it by the operator during the personalization process.

So Mobile Network Operators (MNOs) are physically personalizing the UICC cards in their premises and once for all. Operators then send the personalized UICC card to the user, who will insert it in his mobile terminal to access the mobile network of the MNO. The personalization can also be outsourced to the UICC provider, but it is always configured physically and for ever.

When a user wants to change its MNO, the new MNO sends a new personalized UICC card and the user has to insert this new card into its mobile terminal to access the new network. This implies a problem for devices that should be sold with the UICC inside them (for e.g. security reasons), or devices that are difficult (or too costly) to access, like sensors, cars/trucks, vending machines . . . . For these devices, the manual replacement of the UICC card is too costly or even impossible.

There is need to allow easy reconfiguration of the UICC of the mobile terminal with a different set of credentials, in order to change the serving mobile network operator.

SUMMARY

To remedy the problems referred to hereinabove, a method for personalizing a smart card coupled with a communication device of a user being a subscriber of a first telecommunication network and wishing to become a subscriber of a second telecommunication network, a first international identity and a first authentication key being stored in the smart card, comprises the following steps in an application server connected to the first telecommunication network and the second telecommunication network:

receiving a request of subscription change comprising an identifier of the second telecommunication network, establishing a secured session with the home location register of the second telecommunication network identified by the identifier and receiving a first message comprising a second international identity and a second authentication key from the home location register, and sending a second message comprising a personalization command, an admin code, the second international identity and the second authentication key to the communication device, the smart card being able to interpret the personalization command to delete the first international identity and the first authentication key and replace them by the second international identity and the second authentication key if the admin code is valid.

The invention advantageously allows a remote reconfiguration of credentials associated with a telecommunication network operator and allows ability to easily change of the subscription of telecommunication network operator in a very flexible way, in a non-limited number of times.

The invention advantageously enables new roaming offers which will benefit to the subscriber, since it will leverage on a local subscription without having to change its smart cards and allows embedment of smart cards into communication devices.

In an embodiment, the request of subscription change can be sent by the communication device or by an entity of the second telecommunication network after user agreement.

In an embodiment, the request can comprise an identifier of the smart card, and the application server retrieves the admin code that was initially stored in a database in correspondence with an identifier of the smart card corresponding to identifier of the smart card comprised in the received request, before sending the second message.

In an embodiment, an application in the smart card can check if the admin code received in the second message is the same as an admin code initially stored in the smart card in order to determine if the admin code is valid.

In an embodiment, the application server can inform the operator of the first telecommunication network that the user is not a subscriber of this latter anymore, in order that the operator of the first telecommunication network deletes the first international identity and the first authentication key in the home location register of the first telecommunication network.

In an embodiment, the second message can be an encrypted short message and can be decomposed in many messages.

In an embodiment, the secured session between the application server and the home location register can be established through a network entity that acts as an interface able to interrogate the register and to retrieve from this latter the international identity and the authentication.

In an embodiment, the application server can interrogate an entity of the first telecommunication network in order to obtain an acknowledgement for subscription change, before sending the personalization message to the communication device.

A further object of the invention is an application server for personalizing a smart card coupled with a communication device of a user being a subscriber of a first telecommunication network and wishing to become a subscriber of a second telecommunication network, a first international identity and a first authentication key being stored in the smart card, the application server being connected to the first telecommunication network and the second telecommunication network and comprising:

means for receiving a request of subscription change comprising an identifier of the smart card and an identifier of the second telecommunication network, means for establishing a secured session with the home location register of the second telecommunication network identified by the identifier and receiving a first message comprising a second international identity and a second authentication key from the home location register, and means for sending a second message comprising a personalization command, an admin code, the second international identity and the second authentication key to the communication device, the smart card being able to interpret the personalization command to delete the first international identity and the first authentication key and replace them by the second international identity and the second authentication key if the admin code is valid.

A further object of the invention is smart card coupled with a communication device of a user being a subscriber of a first telecommunication network and wishing to become a subscriber of a second telecommunication network, a first international identity and a first authentication key being stored in the smart card, an application server being connected to the first telecommunication network and the second telecommunication network, the smart card comprising:

means for receiving a message comprising a personalization command, an admin code, a second international identity and a second authentication key, the message being sent by the application server after this latter has received a request of subscription change comprising an identifier of the second telecommunication network, has established a secured session with the home location register of the second telecommunication network identified by the identifier and has received another message comprising the second international identity and the second authentication key from the home location register, and means for interpreting the personalization command to delete the first international identity and the first authentication key and replace them by the second international identity and the second authentication key if the admin code is valid.

The invention relates further to a computer program adapted to be executed in a server for performing a personalization of a smart card coupled with a communication device, said program including instructions which, when the program is executed in said server, execute the steps of the method of the invention.

BRIEF DESCRIPTION OF THE FIGURES

Some embodiments of the present invention are now described, by way of example only, and with reference to the accompanying drawings, in which.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
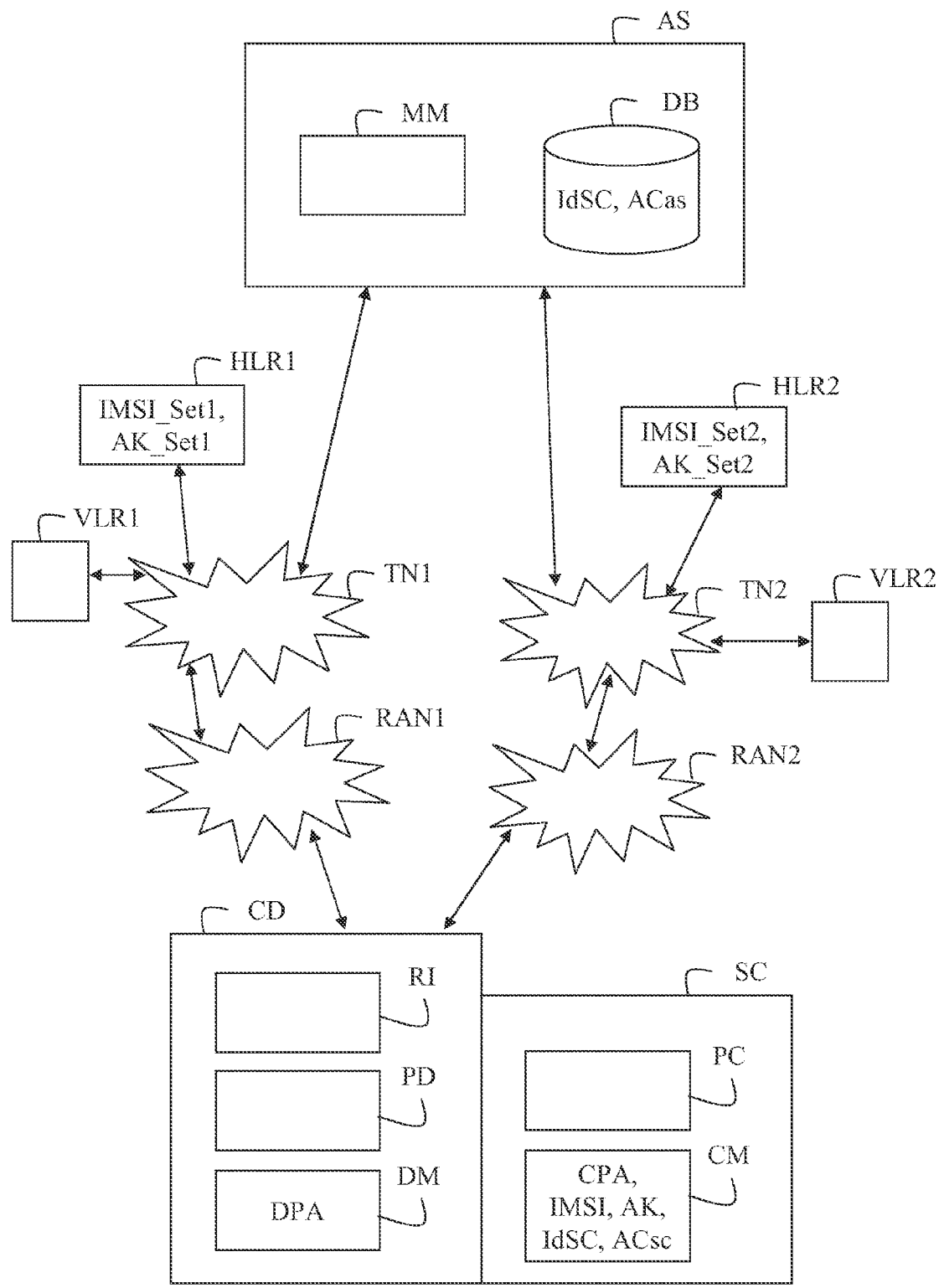
FIG. 1 is a schematic block-diagram of a communication system according to an embodiment of the invention.

Referring to FIG. 1, a communication system comprises an application server AS and a communication device CD which are able to communicate between them through a first telecommunication network TN1 and a second telecommunication network TN2.

For example, the telecommunication network TN1, TN2 is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio. For example, the telecommunication network is able to authorize a communication device to send and receive data via the network when the communication device is identified at the network, for example by means of a subscriber identification module associated with the communication device.

FIG. 1 does not represent known main components of the localization area of the telecommunication network where the communication device is situated. For example in a GSM type network, the localization area comprises an MSC (Mobile service Switching Center) which is connected by means of a BSC (Base Station Controller) to a base station BTS (Base Transceiver Station) connected by means of a radio link to the communication device.

The communication device CD can establish a connection with the telecommunication network TN1, TN2 through a respective radio access network RAN1, RAN2 via a radio link with the base station. The radio access networks are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station.

Each telecommunication network TN1, TN2 comprises a respective Home Location Register HLR1, HLR2 and one or more Visitor Location Register VLR1, VLR2. Each register HLR1, HLR2 collaborates with an authentication center that manages a respective database containing, in particular, a respective set IMSI_Set1, IMSI_Set2 of international identities IMSI (International Mobile Subscriber Identity) and a respective set AK_Set1, AK_Set2 of an authentication keys called AK each associated with a subscription profile for each user of the network and the number of the register VLR1, VLR2 to which the communication device is temporarily connected.

The communication device CD can be a radio communication mobile terminal. For example, the communication device CD is a mobile phone, or is a communicating Personal Digital Assistant PDA, or an intelligent telephone like SmartPhone.

In an example, the communication device CD is a cellular mobile radio communication terminal, connected by a channel to a radio access network of the telecommunication network TN, e.g. GSM (Global System for Mobile communications) or UMTS (Universal Mobile Telecommunications System) or LTE (Long Term Evolution).

By way of example, the communication device CD may be a motor vehicle belonging to a taxi company, or an automatic counter of a particular energy, such as water, gas, or electricity belonging to a company in the energy sector, or a beverage vending machine belonging to a company specializing in food vending. The communication device CD is therefore a fixed or mobile device that contains a UICC card and can communicate with the telecommunication network by means of the UICC card.

In other examples, the communication device CD can be replaced by any device which is equipped with a smart card reader and can communicate with the smart card.

In one embodiment, it is considered that the communication device CD is owned by a user who is a subscriber of the first telecommunication network TN1 and who wishes to become a subscriber of the second telecommunication network TN2, cancelling thus its subscription to the first telecommunication network.

In all cases, it is considered that the communication device and the smart card are owned by a user. For example, the user can be a physical person or an individual in case the communication device is a mobile terminal or a SmartPhone, and the user can be a moral person or a legal entity in case the communication device is a machine like a motor vehicle or an automatic counter.

The communication device CD is associated with a smart card SC, for example included in the communication device CD.

The communication device CD comprises a radio interface RI, a processor PD, device memories MD and a smart card reader. The memories MD comprise various memories such as ROM memory, nonvolatile memory EEPROM or Flash, and RAM memory.

The radio interface RI transposes in frequency, converts digitally, demodulates and decodes messages received via the telecommunication network TN, and inversely transmits messages.

The device memories MD comprise the operating system of the communication device CD and an execution environment such as a Java virtual machine JVMT programmed in Java, for example J2ME.

In particular, in the nonvolatile memory of device memories MD are implemented device applications, originally written in a high level language of type object-oriented such as language Java compatible with virtual machine JVMT. The virtual machine JVMT can communicate with a virtual machine JVMC installed in the smart card SC via a predetermined communication protocol, like protocol APDU.

In order that device applications respectively communicate with card applications implemented in the smart card SC in accordance with predetermined communication protocol, an access interface to access resources and data in the smart card is implemented in the device memories DM for example under the form of a Java API (Application Programming Interface).

Device memories DM further include a communication interface, for example the SIM Toolkit engine, so that a main application SIM or USIM or any other application in the smart card communicates with the "outside world" via the communication device, for example with an application server. The communication interface manages commands and responses exchanged between the "outside world" and the main application SIM or USIM, for example by adapting them to short messages exchanged with a short message server.

The smart card SC, also known as microcontroller card or integrated circuit card, is a user identity module of UICC type associated with the communication device.

In one embodiment, a microcontroller in the smart card SC mainly comprises one or more processors PC, and card memories CM. The smart card exchange commands, or requests, and replies with the communication device CD via an input/output port of the smart card reader of the communication device CD with or without contact. The various components of the smart card may be interconnected by a bidirectional bus.

Card memories CM comprise memory of type Flash or ROM including codes and data for example of an operating system and a virtual machine JVMC compliant with the Java Card specification, or any other operating system.

Card memories CM comprise also memory of type Flash or EEPROM for storing for example identity numbers and other parameters of the profile of the user possessing the card, such as a PIN code, an international identity IMSI, an authentication key AK, an identifier IdSC of the smart card, an admin code ACsc, and other security data.

Card memories CM comprise also memory of type RAM serving more particularly to data processing.

Card memories CM comprise also a memory space to store card applications which are proprietary code or applets STK, e.g. SIM ToolKit, and that are installed during the manufacture of the smart card or possibly installed during use of the card at the request of the user or the operator.

In particular, a card personalization application CPA is stored in the card memories CM and has a read/write access especially to the international identity IMSI, the authentication key AK, and the identifier IdSC, for example under an OTA command presenting the admin code ACsc. The card personalization application CPA is able to handle commands and messages according to an over-the-air (OTA) mechanism and is able to communicate with a corresponding device personalization application DPA stored in the device memories DM of the communication device CD for some functionalities such as an interface with the user, and is also able to communicate with the application server AS for the personalization of the smart card.

The application server AS is a server included in a network connected to the first and the second telecommunication networks TN1 and TN2, but is not managed by any operator of these telecommunication networks, acting as an independent service entity. In one variant, the application server AS is managed by one of the the first and the second telecommunication networks TN1 and TN2.

The application server AS is a platform that is accessible from the communication device CD through either the first and the second telecommunication networks TN1 and TN2. The application server AS is able to communicate with the register HLR1 and HLR2 directly or through the first and the second telecommunication networks TN1 and TN2 respectively, via a secured session for example of IPsec (Internet Protocol Security) type.

The application server AS comprises a messaging module MM handling exchange of messages with the communication device CD, for example in the form of short message through a short message center, and handling exchange of messages with entities of the first and the second telecommunication networks TN1 and TN2.

The application server AS manages a database DB wherein admin codes ACas are stored in correspondence with identifiers IdSC of smart cards. An admin code corresponds to a secret shared between the application server AS and a smart card SC, and is unique for each smart card SC. It is considered that an admin code allows a command provided through an OTA mechanism to obtain read/write access to the space memory of the smart card SC where the international identity IMSI and the authentication key AK are stored.

Figure 2:
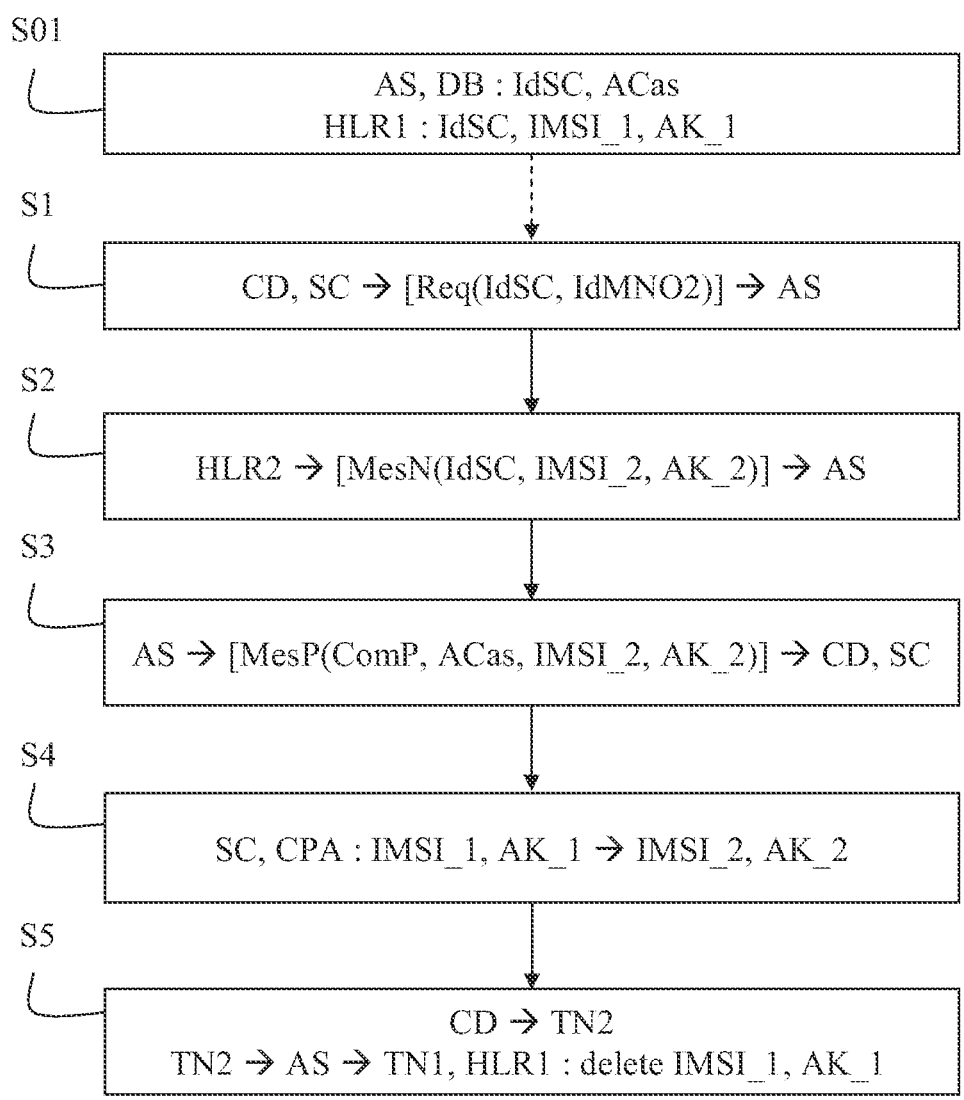
FIG. 2 is a flowchart showing steps performed to execute a method for personalizing a smart card coupled with a communication device in a telecommunication network according to an embodiment of the invention.

With reference to FIG. 2, a method for personalizing a smart card coupled with a communication device according to one embodiment of the invention comprises steps S1 to S5 executed automatically within the communication system.

The method is described hereinafter with reference to the first and the second telecommunication networks TN1 and TN2 for a user who is a subscriber of the first telecommunication network TN1 and who wishes to become a subscriber of the second telecommunication network TN2, but can be extended to more telecommunication networks.

At an initial step S01, the application server AS communicates with each operator of the first and the second telecommunication networks TN1 and TN2, in order to make agreement for potential subscription change of users and to set an encryption key for session dedicated for such subscription change.

The application server AS also stores in the database DB the admin codes ACas respectively associated with smart cards SC of users who are subscribers of the first and the second telecommunication networks TN1 and TN2. The admin codes ACas may be obtained from the smart card manufacturer, before the smart cards are provided to the operators. For example, the admin code ACas is stored in correspondence with an identifier IdSC of the smart card.

Once a smart card is provided to the operator and attributed to a user who becomes a subscriber of the operator, the operator personalizes the smart card by creating an international identity and an authentication key. The personalization of the smart card could be also outsourced to the smart card manufacturer. The created international identity and authentication key are stored in the register HLR in correspondence with the identifier of the smart card.

In the example embodiment, a user becomes a subscriber of the first telecommunication network TN1. The database of register HLR1 contains the identifier IdSC of the smart card stored in correspondence with an international identity IMSI_1 included in the set IMSI_Set1 and with an authentication key AK_1 included in the set AK_Set1. Also, the international identity IMSI_1 and the authentication key AK_1 are stored in the card memories CM of the smart card SC.

At step S1, the user solicits a request in order to change its operator subscription for the operator of the second telecommunication network TN2. For example, the user selects a command in a menu displayed in the communication device by a device personalization application DPA or enters a code of command read from a document of the operator.

The communication device CD sends a request Req comprising the identifier IdSC of the smart card and an identifier IdMNO2 of the second telecommunication network TN2 to the application server AS.

In one embodiment, the request Req is in the form of a short message which is handled by a short message center that transforms the message into data packets and sends the data packets through first the telecommunication network TN1 to the application server AS.

In a variant embodiment, the user does not transmit the request to the application server but the user contacts a customer center of the operator of the second telecommunication network TN2, for example via a contact center or a web site, and provides the identifier IdSC of the smart card to the operator. After user agreement, an entity of the operator sends a similar request Req to the application server AS, the request comprising also the identifier IdSC of the smart card and an identifier IdMNO2 of the second telecommunication network TN2.

The messaging module MM of the application server AS receives the request and interprets it as a request of subscription change in favor of the operator of the second telecommunication network TN2 thanks to the received identifier IdMNO2. In particular, the application server AS checks if the identifier IdSC is stored in the database DB, which means that the application server AS can perform the smart card personalization.

At step S2, the messaging module MM of the application server AS establishes a secured session, for example of IPsec type, with the second telecommunication network TN2, in particular with the register HLR2, identified by the identifier IdMNO2. The register HLR2 then provides a free international identity that will be associated with the user in order that this latter becomes subscriber to the second telecommunication network TN2. The register HLR2 creates an international identity IMSI_2 that is included in the set IMSI_Set2 and stored in correspondence with an authentication key AK_2 that is included in the set AK_Set2.

The register HLR2 sends a notification message MesN comprising the international identity IMSI_2 and the authentication key AK_2, and optionally the identifier IdSC of the smart card, to the application server AS via the secured session.

In an embodiment, the messaging module MM of the application server AS establishes a secured session with the register HLR2, through a network entity that acts as an interface able to interrogate the register HLR2 and to retrieve from this latter the international identity IMSI_2 and the authentication key AK_2.

At step S3, the messaging module MM of the application server AS receives the notification message MesN and retrieves the identifier IdSC of the smart card stored in the database DB corresponding to identifier IdSC of the smart comprised in the request Req or optionally in the notification message MesN. The application server AS retrieves then the admin code ACas stored in correspondence with the identifier IdSC of the smart card in the database.

The messaging module MM of the application server AS sends a personalization message MesP comprising a personalization command ComP, the admin code ACas, the international identity IMSI_2 and the authentication key AK_2 to the communication device CD. The personalization message MesP is sent from the application server AS across the first networks TN1 and RAN1 to the smart card SC via the communication interface of the communication device CD.

For example, the personalization message MesP is transformed by a short message center of the first telecommunication network TN1 into a short message that is encrypted. The received personalization message MesP is decrypted by the smart card and the content of the message is temporarily stored in the card memories CM of the smart card to be executed by the card personalization application CPA.

At step S4, the card personalization application CPA interprets the personalization command ComP to execute the personalization of the smart card SC. The card personalization application CPA checks if the admin code ACas is valid, that is to say if the admin code ACas received in the personalization message MesP is compatible with the admin code ACsc initially stored in the smart card. In one example, the admin code ACas received in the response ResP has to be the same as the admin code ACsc initially stored in the smart card. More generally, the admin codes may be tools used for authentication and ciphering procedures, in particular in case the personalization message MesP is decomposed in many messages.

If the admin code ACas is valid, the card personalization application CPA deletes the identity IMSI_1 and the authentication key AK_1 initially stored in the card memories CM of the smart card SC, and replace them by the received international identity IMSI_2 and authentication key AK_2.

Optionally, the card personalization application CPA can activate the device personalization application DPA in order to ask an acknowledgement of the user for the card personalization. For example, the device personalization application DPA displays a question like the following: "Are you sure to change MNO and to become subscriber of MNO2?".

At step S5, the communication device CD can launch a connection request to be attached to the second telecommunication network TN2, for example by sending a "IMSI-attach" signalling message.

The operator of the second telecommunication network TN2 is aware of the success of the personalization of the smart card, for example after a successful authentication of the communication device CD by the second telecommunication network TN2, and informs the application server AS. The application server AS then informs the operator of the first telecommunication network TN1 that the user is not a subscriber of this latter anymore. The operator of the first telecommunication network TN1 can delete the international identity IMSI_1 and the authentication key AK_1 in the database of the register HLR1.

Optionally, the application server AS informs the operator of the first telecommunication network TN1 that the user will not be a subscriber of this latter anymore, at step S3 before sending the personalization message MesP to the communication device CD. For example, the application server AS interrogates an entity of the first telecommunication network TN1 in order to obtain an acknowledgement for subscription change.

The invention described here relates to a method and a server for a personalization of a smart card coupled with a communication device. In an embodiment, the steps of the method of the invention are determined by the instructions of a computer program incorporated in a server such as the application server AS according to the invention. The program includes program instructions which, when said program is executed in a processor of the server the operation whereof is then controlled by the execution of the program, execute the steps of the method according to the invention.

As a consequence, the invention applies also to a computer program, in particular a computer program on or in an information medium readable by a data processing device, adapted to implement the invention. That program may use any programming language and be in the form of source code, object code or an intermediate code between source code and object code, such as a partially compiled form, or in any other desirable form for implementing the method according to the invention.

The information medium may be any entity or device capable of storing the program. For example, the medium may include storage means or a recording medium on which the computer program according to the invention is recorded, such as a ROM, for example a CD ROM or a microelectronic circuit ROM, or a USB key, or magnetic recording means, for example a diskette (floppy disk) or a hard disk.

The invention claimed is:

1. A method for personalizing a smart card associated with a subscription to a first telecommunication network and coupled with a communication device, the method comprising the steps of:
   receiving, at a server connected to the first telecommunication network and to a second telecommunication network, a request of a subscription change having an identifier of the second telecommunication network;
   establishing, at the server, a secured session with a home location register of the second telecommunication network identified by the identifier;
   receiving, at the server, a first message having a second international identity and a second authentication key from the home location register; and
   sending, at the server, a second message having a personalization command, an admin code, the second international identity and the second authentication key to the communication device.

2. The method of claim 1, wherein the request of the subscription change is received from the communication device or from an entity of the second telecommunication network.

3. The method of claim 1, wherein the request includes an identifier of the smart card; and further comprising the step of:
   retrieving, at the server, the admin code in correspondence with the identifier of the smart card, before sending the second message.

4. The method of claim 1, wherein an application in the smart card checks if the admin code received in the second message is compatible with an initial admin code initially stored in the smart card in order to determine if the admin code is valid.

5. The method of claim 1, further comprising the step of informing, at the server, the first telecommunication network of a subscription change.

6. The method of claim 1, wherein the second message is an encrypted short message.

7. The method of claim 1, wherein the second message is decomposed in a plurality of messages.

8. The method of claim 1, wherein the secured session with the home location register is established through a network entity that acts as an interface able to interrogate the home location register to retrieve the second international identity and the second authentication key.

9. The method of claim 1, further comprising the step of interrogating, at the server, an entity of the first telecommunication network in order to obtain an acknowledgement for subscription change, before sending the second message.

10. An application server for personalizing a smart card associated with a subscription to a first telecommunication network and coupled with a communication device, the application server comprising:

means for receiving a request of a subscription change comprising an identifier of a second telecommunication network;

means for establishing a secured session with a home location register of the second telecommunication network identified by the identifier and receiving a first message having a second international identity and a second authentication key from the home location register; and means for sending a second message having a personalization command, an admin code, the second international identity and the second authentication key to the communication device.

11. A non-transitory information medium storing computer-executable instructions for performing a method for personalizing a smart card associated with a subscription to a first telecommunication network and coupled with a communication device, the method comprising the steps of:

receiving a request of a subscription change having an identifier of a second telecommunication network;

establishing a secured session with a home location register of the second telecommunication network identified by the identifier and receiving a first message having a second international identity and a second authentication key from the home location register; and sending a second message having a personalization command, an admin code, the second international identity and the second authentication key to the communication device.

12. A smart card, comprising:

means for receiving a message having a personalization command, an admin code, a second international identity and a second authentication key, wherein the message is an encrypted short message; and means for interpreting the personalization command to delete a first international identity and a first authentication key and replace them by the second international identity and the second authentication key if the admin code is valid.

* * * * *